United States Patent
Mohamad et al.

(10) Patent No.: US 8,428,473 B2
(45) Date of Patent: Apr. 23, 2013

(54) STABLE MILLIMETER WAVE SOURCE FOR BROADBAND WIRELESS SIGNAL TRANSMISSION USING OPTICAL FIBRE

(75) Inventors: Romli Mohamad, Kajang (MY); Mohamed Razman Yahya, Bandar Baru Bangi (MY); Wan Razli Wan Abdullah, Kajang (MY); Norhakimah Md Samsuri, Kuala Lumpur (MY); Asmahanim Ahmad, Taman Sri Serdang (MY); Syamsuri Yaakob, Kuala Lumpur (MY); Muhammad Zamzuri Abdul Kadir, Kajang (MY)

(73) Assignee: Telekom Malaysia Behad, Kuala Lumpur (MA)

( * ) Notice: Subject to any disclaimer, the term of this patent is extended or adjusted under 35 U.S.C. 154(b) by 265 days.

(21) Appl. No.: 13/036,195

(22) Filed: Feb. 28, 2011

(65) Prior Publication Data
US 2011/0305463 A1    Dec. 15, 2011

(51) Int. Cl.
*H04B 10/04* (2006.01)
(52) U.S. Cl.
USPC .......................................................... 398/193
(58) Field of Classification Search .................. 398/193
See application file for complete search history.

(56) References Cited

FOREIGN PATENT DOCUMENTS
CN        101382624 A    *   3/2009

* cited by examiner

*Primary Examiner* — Shi K Li
*Assistant Examiner* — Jamil Ahmed
(74) *Attorney, Agent, or Firm* — The H.T. Than Law Group

(57) ABSTRACT

An apparatus and method for generating a millimeter-wave carrier signal for optical data transmission is disclosed. The apparatus includes stimulated Brillouin scattering source (101) that generates a variable stoke line multi-wavelength optical signal, optical amplifiers (102, 108), an optical splitter (103) that splits the amplified output of the SBS source (101) into two identical optical signals of the same magnitude, frequency, phase and electromagnetic mode, identical optical tuneable band-pass filters (104, 105) with the same band-pass, an optical coupler (107) that combines the optical signals emitted from the output of the optical filters (104, 105) such that the output of the coupler (107) is a dual wavelength optical signal with a wavelength separation equivalent to the desired millimeter wave frequency, a photo-detector (109) that converts the optical signal to an electrical signal by heterodyning process, and a controller circuit (106) that controls the gain of the optical amplifiers (102, 108), the tuning of the optical band-pass filters (104, 105) independently and the number of stoke lines produced by the stimulated Brillouin scattering source (101) depending on the electrical millimeter wave output.

10 Claims, 8 Drawing Sheets

STABLE MILLIMETER WAVE SOURCE FOR BROADBAND WIRELESS SIGNAL TRANSMISSION USING OPTICAL FIBRE

The present invention relates to the optical generation of a millimeter wave using the Stimulated Brillouin Scattering (SBS) and the Bragg Grating Filtering technique. More particularly, the present invention relates to a stable millimeter wave optical source for broadband wireless data transmissions via an optical fibre network.

BACKGROUND TO THE INVENTION

Modulation of optical carriers using millimeter-wave signals are desired for telecommunications using fibre optics in order to achieve a wireless broadband service connection and distribution. The millimeter wave signal is desired to be phase coherent with the reference signals. A phase stable millimeter wave signal can be generated by electronic non-linear frequency multiplication of a low frequency reference signal. A phase stable millimeter wave can also be generated in the optical domain for wireless signal transmission using optical fibres. However, the process of generating the millimeter wave in the optical domain has the problem of stability because any small wavelength changes in the optical domain, is translated into a substantial frequency deviation in the electrical domain.

Many methods have been developed to generate millimeter waves, which include combining two laser outputs with frequency offset equal to the desired millimeter wave signal frequency as well as using two independent laser oscillators which are injection locked to different optical modes of a mode-locked laser (dual mode laser) and later combined to produce heterodyne output signals of millimeter wave. However, these techniques do not guarantee the production of a stable millimeter wave signal and are not tuneable for the user to choose the desired frequency for data transmission.

In view of the above limitations, it is desirable to provide a stable millimeter wave source while offering tuning capabilities in order for the users to choose the relevant frequency of choice for broadband wireless data transmission.

SUMMARY OF THE INVENTION

It is an object of the present invention to provide an apparatus and method for the stable generation of a millimeter wave source using a Stimulated Brillouin Scattering (SBS) variable stoke line multi-wavelength optical source capable of producing a few flattened stoke lines, whereby the number of stoke lines produced is controlled by a controller circuit.

It is another object of the present invention to provide an apparatus and method for the stable generation of a tuneable millimeter wave source using optical filters that are automatically tuned by means of a controller circuit.

It is yet another object of the present invention to provide an apparatus and method for the stable generation of a millimeter wave source for use in optical data transmission without the need of complicated and complex Optical Phase Locked Loop (OPLL) circuitry.

Accordingly, there is provided an apparatus for generating a millimeter wave optical signal for optical data transmission, the apparatus including, a Stimulated Brillouin Scattering (SBS) source that generates a variable multi-stokes light wave, a first optical amplifier that amplifies the output of the SBS source, an optical splitter that splits the amplified output of the SBS source into two optical signals of equal proportions, tuneable band-pass filters that extract the relevant stokes of a predetermined wavelength and provide two independent optical outputs that are wavelength displaced from one another by an integer multiple of a frequency that falls within the millimeter wave band of the electromagnetic spectrum, an optical coupler that combines the optical signals emitted from the output of the optical filters such that when the signals for the respective optical filters are fed to the optical coupler, in which the output of the coupler is an optical signal with two specific stokes as selected by the filters with the wavelength separation ($\Delta\lambda$) that is equivalent to the desired millimeter wave frequency, a second optical amplifier that amplifies and flattens the output of the optical coupler, a photo detector that heterodynes the amplified and flattened stokes to an electrical millimeter wave signal and a controller circuit that controls the gain of the first and second optical amplifier, the tuning of the optical band-pass filters to independently extract/select the relevant stokes so that their difference in wavelength (optical) is equivalent to the desired millimeter wave frequency at the photo detector output and the number of stoke lines produced by the SBS source depending on the desired millimeter wave signal output.

The first optical amplifier pre-compensates the losses due to absorption that may occur after the signals are passed through the optical splitter and the optical filters.

The two optical signals of equal proportions emitted by the optical splitter are of the same magnitude, wavelength, phase and electromagnetic mode.

The optical filter is preferably a fibre Bragg grating filter.

BRIEF DESCRIPTION OF THE DRAWINGS

The present invention will now be described in greater detail, with reference to the accompanying drawings. The example embodiment and associated drawings are given solely for guidance purposes and are in no-way restrictive, with reference to the appended drawings.

DETAILED DESCRIPTION OF THE INVENTION

Figure 1:
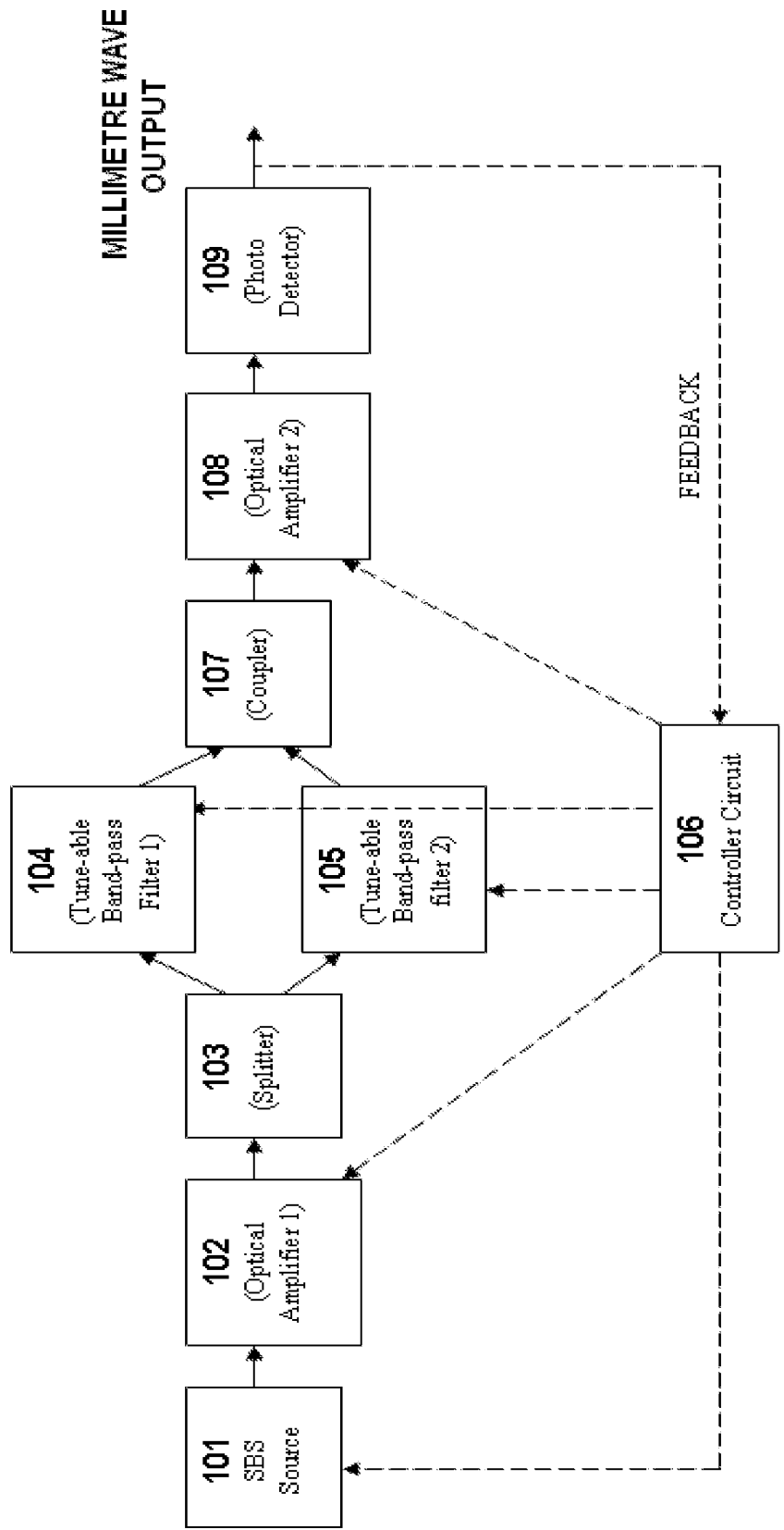
FIG. 1 is a block diagram of an embodiment of the millimeter wave source according to the present invention.

Referring to FIG. 1, a stable millimeter wave source of the present invention consists of a Stimulated Brillouin Scattering (SBS) source 101, a first optical amplifier 102, a splitter 103, a first tuneable band-pass filter 104, a second tuneable band-pass filter 105, a controller circuit 106, a coupler 107, a second optical amplifier 108 and a photo detector 109.

Figure 2:
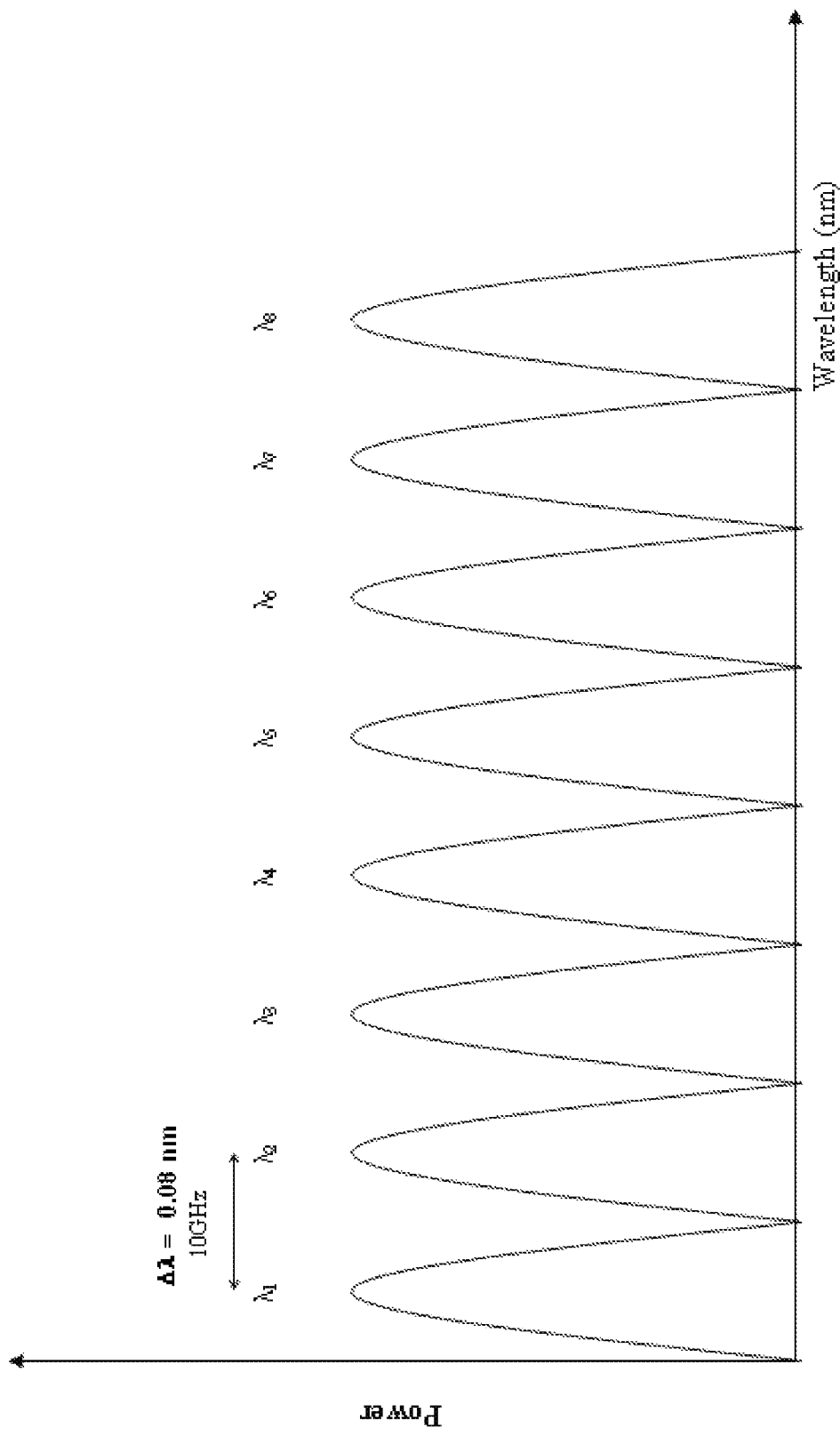
FIG. 2 is a graph that illustrates an example variable stoke line multi-wavelength optical signal produced by the Stimulated Brillouin Scattering (SBS) source.

The SBS source 101 is designed to produce an optical signal that is in itself composed of a multi-stokes light wave signal of various wave-lengths. This optical signal of various wavelengths with multi stokes light wave signal is split into two optical signals of equal proportions, i.e. two optical signals of identical magnitude, frequency, phase and electromagnetic mode. The first tuneable band-pass filter 104 and the second tuneable band-pass filter 105 extract the relevant stokes to provide two independent optical outputs which are then combined by the coupler 107. The combined optical signal has a dual stoke light-wave, wherein the two stokes are displaced in wavelength from one another by a value that is numerically equal to a frequency that falls within the EHF (Extremely High Frequency) or "Millimeter Wave" band of the electromagnetic spectrum. An example of a numerical value of the difference in frequency between the various wavelengths of signals that make up the optical signal that is output from the SBS source is 10 GHz, as is illustrated in FIG. 2. The number of stoke lines emitted from the SBS source is controlled by the controller circuit 106 upon receiving feedback from the output of the system. The number of stoke lines that can be generated from the SBS source are limited by the frequency range encompassed by the EHF band of the electromagnetic spectrum.

The stoke lines output from the SBS source 101 are then fed to the input of the first optical amplifier 102, in which the signal is amplified to pre-compensate for losses that may occur during the splitting and filtering stages of the system. The amplified signal is then fed to an optical splitter (50:50) 103 that breaks the fed optical signal into two signals of equal proportions, i.e. of equal magnitude, phase, frequency and electromagnetic mode. These two equal but independent multi-wavelength optical signals (or multi-stokes light wave signal) are subsequently processed by two separate tuneable optical band-pass filters 104, 105 respectively. In a preferred embodiment of the present invention, the filters are fibre Bragg grating filters.

The optical signals (the two equally proportioned optical signals that are of equal magnitude, phase, frequency and electromagnetic mode) are the fed to the two tuneable optical filters 104,105 (Fibre Bragg Grating Filters) respectively.

The outputs of the first 104 and second 105 optical filters respectively is an optical signal that results when the SBS source 101 produces an optical signal that is composed of a multi-stokes light wave signal of various wave-lengths with a wavelength separation between any two adjacent stokes, $\Delta\lambda$, equivalent to the millimeter wave frequency component.

Figure 7:
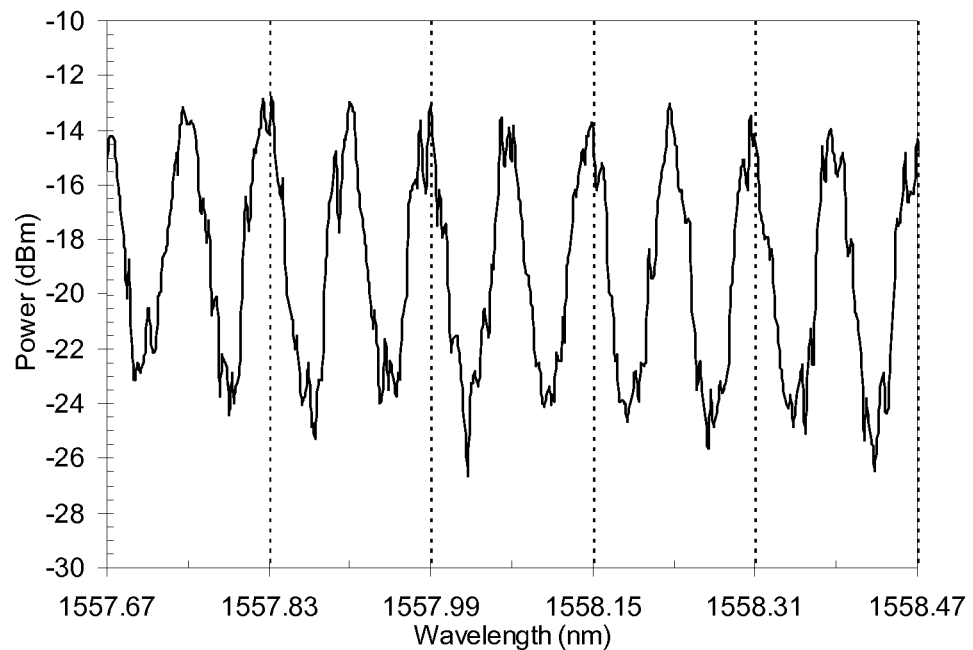
FIG. 7 is graph illustrating a sample experimental multi-stokes light-wave obtained from the Stimulated Brillouin Scattering (SBS) source of the present invention.

FIG. 7 is graph illustrating a sample experimental multi stoke light wave signal obtained from the Stimulated Brillouin Scattering (SBS) source 101 of the present invention.

Figure 3:
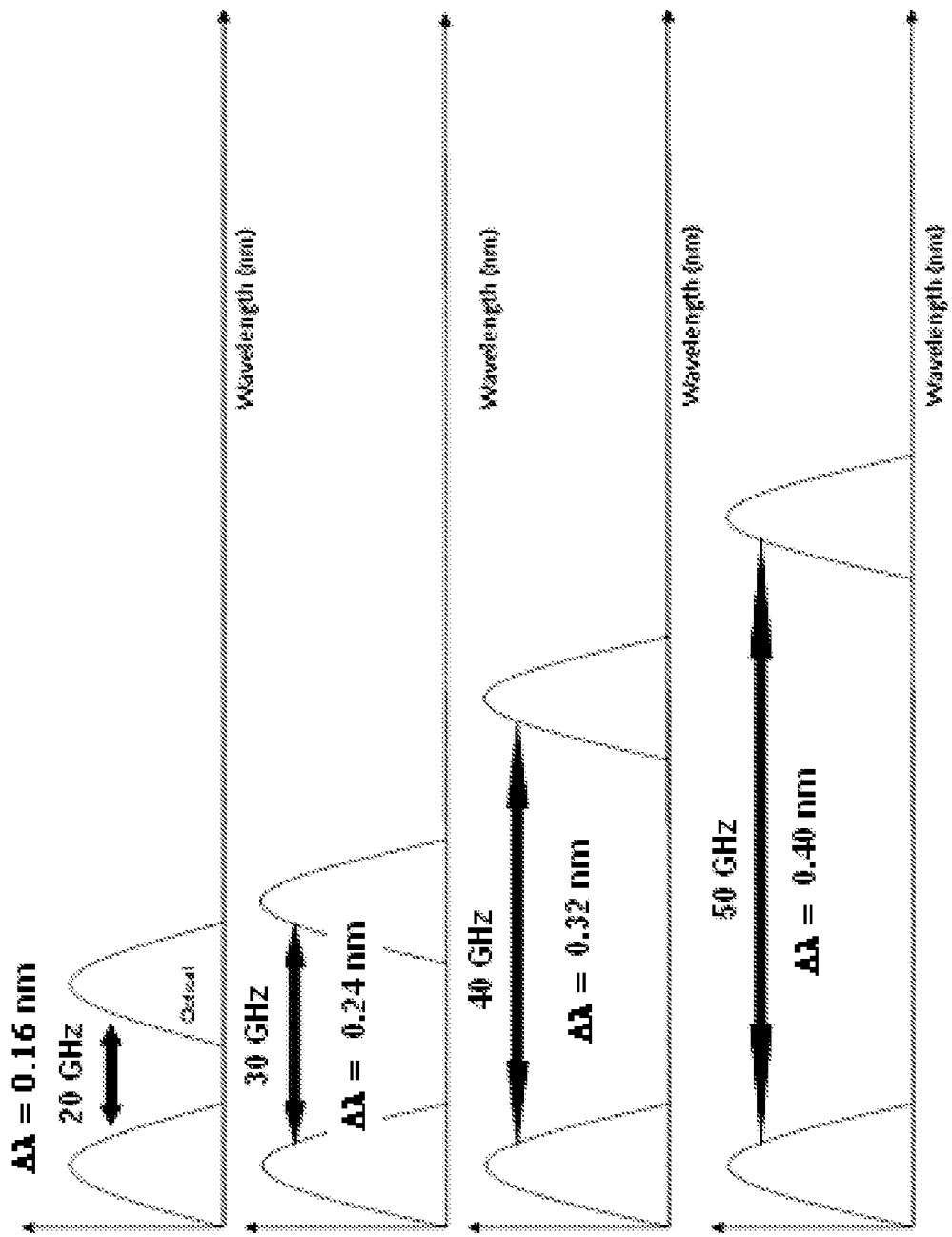
FIG. 3 is a graph that illustrates the combined spectra of the output of the first optical filter and the second optical filter for various possible wavelength separations ($\Delta\lambda$s) that are equivalent to the desired millimeter wave frequency.
Figure 4:
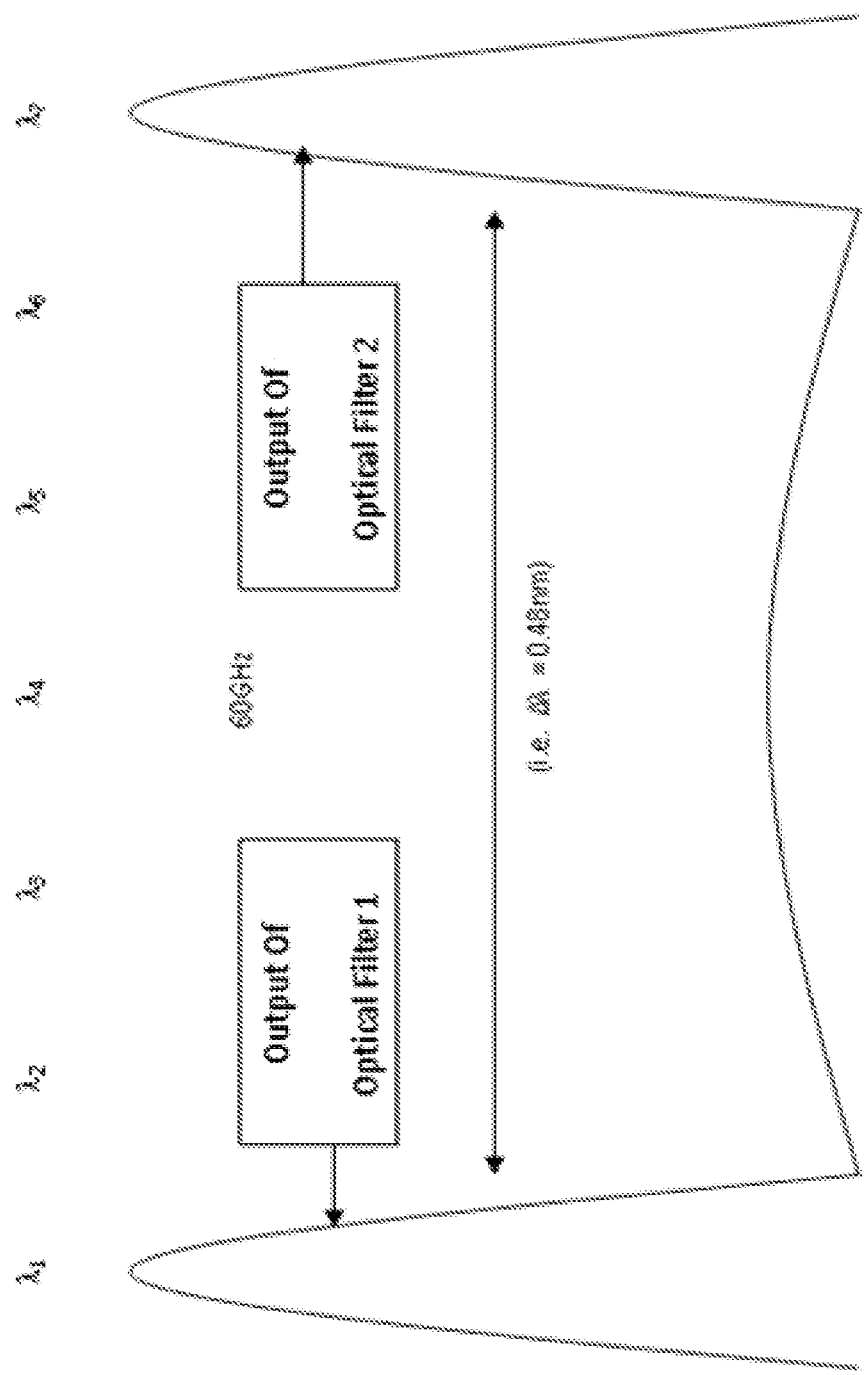
FIG. 4 is a graph that illustrates the output of the optical coupler which is the combined frequency spectra of the output of the first optical filter and the second optical filter, in which the signal filtered can have a wavelength ranging from the discrete values of $\lambda 1$ to $\lambda 8$.

The two optical filters 104, 105 are tuneable to allow an optical signal of the desired stokes wavelength to be fed into an optical coupler 107, wherein the output from these optical filters 104, 105 are combined in the optical coupler 107 resulting in a dual-wavelength optical signal with a wavelength separation equal to the desired millimeter wave frequency. This frequency is an integer multiple of a frequency that is equivalent to the wavelength separation of two adjacent wavelengths of the multi-stokes optical signal produced by the SBS source 101. Based on the example illustration of FIG. 2, this value of frequency is 10 GHz and the corresponding wavelength separation, $\Delta\lambda$, between any two adjacent wavelengths of the multi-stoke optical signal of the SBS source 101 is equal to 0.08 nm. This operation results in a dual-wavelength optical signal with the desired millimeter wave frequency. FIGS. 3 and 4 illustrate example outputs of the optical coupler 107.

FIG. 3 illustrates the output of the optical coupler 107, in which it illustrates the many possible wavelength separations ($\Delta\lambda$s) that would result in an electrical signal with a range of desired millimeter wave frequencies ranging from 20 GHz to 50 GHz after the dual wavelength signals are amplified by the second optical amplifier 108 and subsequently heterodyned by the photo detector 109. The figure illustrates dual wavelength optical signals with a wavelength separation, $\Delta\lambda$, of 0.16 nm, 0.24 nm and 0.32 nm that correspond to millimeter wave frequencies of 20 GHz, 30 GHz and 40 GHz in the electrical spectrum, respectively.

FIG. 4 illustrates an example optical coupler 107 output that is a dual wavelength optical signal with a wavelength separation between the two wavelengths, $\Delta\lambda$, equals to 0.48 nm which will consequently be converted into a 60 GHz millimeter-wave electrical signal (see FIG. 5) after the heterodyning process in the photo detector.

Once this dual-wavelength optical signal with the desired wavelength separation, $\Delta\lambda$, that in turn corresponds to the desired millimeter wave frequency is produced at the output of the optical coupler 107 as a consequence of combining the outputs of the tuneable filters 104,105, this signal is amplified by means of a second optical amplifier 108 to increase the signal level and flatten the stoke line before it is fed to a photo-detector 109 that subsequently converts this optical signal into the desired millimeter wave signal ready for use in various communication and scientific applications.

Figure 5:
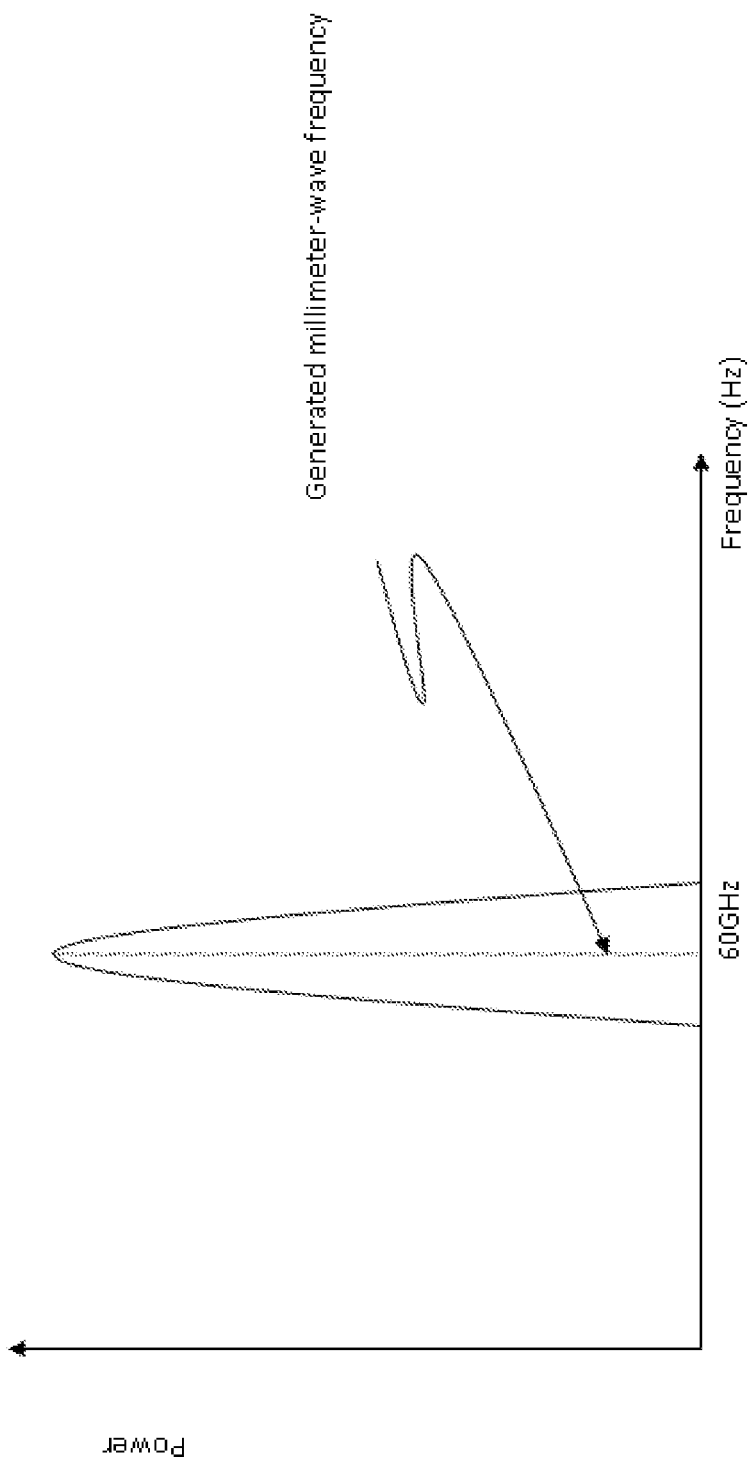
FIG. 5 is a graph that illustrates the output of the photo detector, which is an electrical signal with a frequency of 60 GHz.

FIG. 5 illustrates an example of the spectral output of the photo detector 109. The resulting electrical millimeter wave signal results from the combination of the output of the first optical filter 104 and the second optical filter 105 that is available at the output of the optical coupler 107 and is subsequently heterodyned at the photo detector 109. The illustrated millimeter wave signal's frequency spectrum is obtained when the wavelength separation ($\Delta\lambda$) between the two wavelengths of the dual-wavelength output of the optical coupler 107 is 0.48 nm. This wavelength separation corresponds to a millimeter wave centre-frequency of 60 GHz.

The controller circuit 106 provides a means for the system to stabilize its electrical millimeter wave output. Based on the output from the system that is fed back to the controller circuit 106, the controller circuit 106 controls firstly the number of stoke lines emitted by the SBS source 101, secondly the wavelength to which the first optical filter 104 and the second optical filter 105 are tuned to, and thirdly the gain of optical amplifiers 102, 108 respectively.

The method for generating a millimeter wave signal for use in optical data transmission in accordance with the present invention will now be described with reference to FIG. 6.

Figure 6:
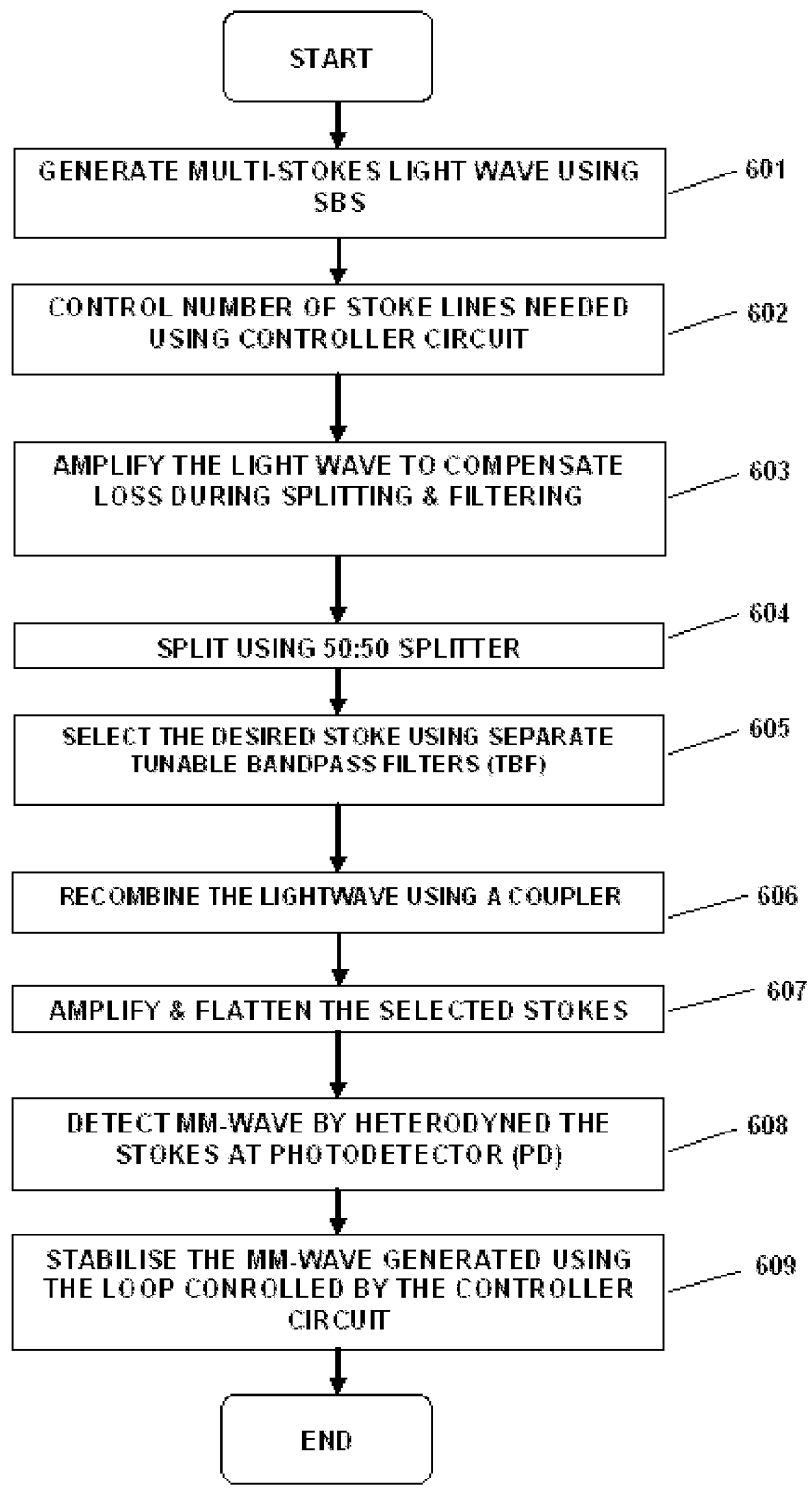
FIG. 6 is a flowchart illustrating the method for generating a millimeter wave electrical signal in accordance with a preferred embodiment of the present invention.

Referring to FIG. 6, the first step, 601, of the generation of a stable millimeter wave source for broadband wireless signal transmission using an optical fibre of the present invention consists of generating a multi-stokes light-wave signal by means of Stimulated Brillouin Scattering (SBS). The number of stokes of the light wave signal should be limited such that a sufficient number stokes of the multi-stoke light wave signal, are generated for selection to be later filtered. Hence in step 602, the number of stokes of the light wave signal generated by means of Stimulated Brillouin Scattering is controlled to the desired number of stoke lines required. The wavelength separation, $\Delta\lambda$, between any two adjacent wavelengths of the multi-stoke light wave generated by means of SBS (Stimulated Brillouin Scattering)), that is available at the output of the optical coupler 107, should be equivalent to a numerical value of frequency whereby this frequency should lie well within the millimeter wave band electromagnetic frequency spectrum.

The subsequent step, 603 as illustrated in FIG. 6 entails that the multi-stoke light wave signal generated by means of SBS is amplified according to a predetermined gain in order to compensate for losses that may occur in the subsequent optical splitting stage 604 and filtering stage 605. In the optical splitting stage 604, the resulting amplified and stoke-limited multi-stoke light wave signal is split into two equally proportioned (50:50) optical signals, i.e. that are of equal magnitude, phase, frequency and electromagnetic mode. The resulting two optically split, identical but independent multi-stoke light wave signals are then fed to an optical filtering stage 605 in which the signals undergo tuned filtering by way of the Bragg Filtering Technique. More specifically, the two identical multi-stoke light-wave signals are independently and selectively tuned to different wavelengths of the available spectrum of wavelengths contained in the original multi-stoke light-wave, such that when the resulting two filtered singular stoke light-wave signals are combined in the optical coupling (recombination) stage 606, the resultant optical signal will be a dual-wavelength optical signal with a separation between the individual wavelengths, $\Delta\lambda$, that corresponds to an integer multiple of a numerical value of frequency that falls within the millimeter wave band spectrum. This frequency is the frequency that corresponds to the wavelength separation, $\Delta\lambda$, between any two adjacent wavelengths of the original multi-stoke light wave signal that is produced by way of SBS.

The resulting afore-mentioned dual wavelength optical signal that results from the optical combination (optical coupling) stage 606 is then amplified according to a predefined gain to consequently amplify and flatten the stoke line of the dual-wavelength optical signal, i.e. step 607. The amplified dual-wavelength optical signal is then heterodyned and hence detected in step 608 to produce the desired electrical millimeter wave signal. The entire process from the generation of the multi-stoke light wave signal by means of SBS to the production of the desired electrical millimeter wave signal is stabilized by means of loop controlling via a controller circuit in step 609.

Figure 8:
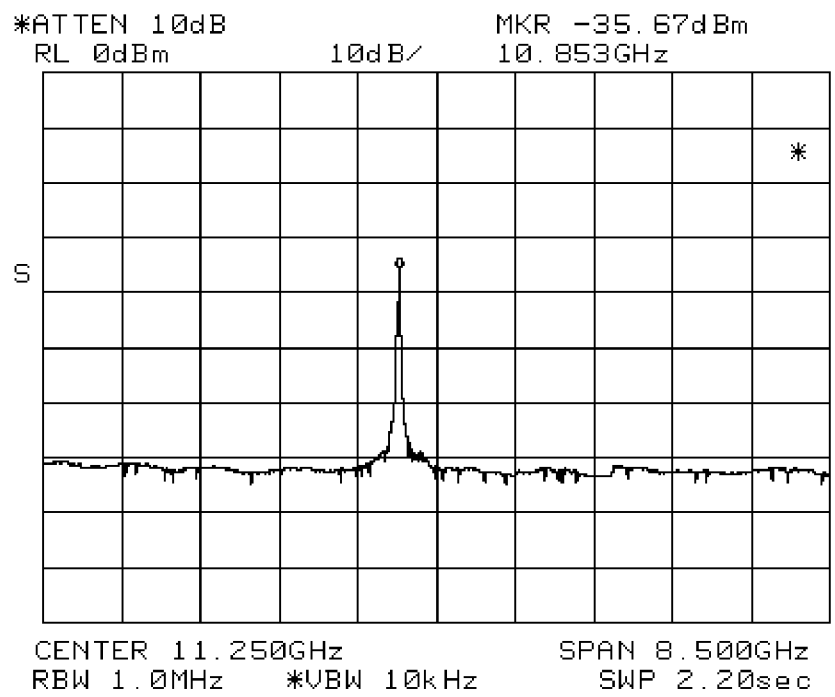
FIG. 8 is a graph illustrating a sample experimental 10 GHz output spectrum of the photo-detector when $\Delta\lambda$ is equal to 0.086 nm.
Figure 9:
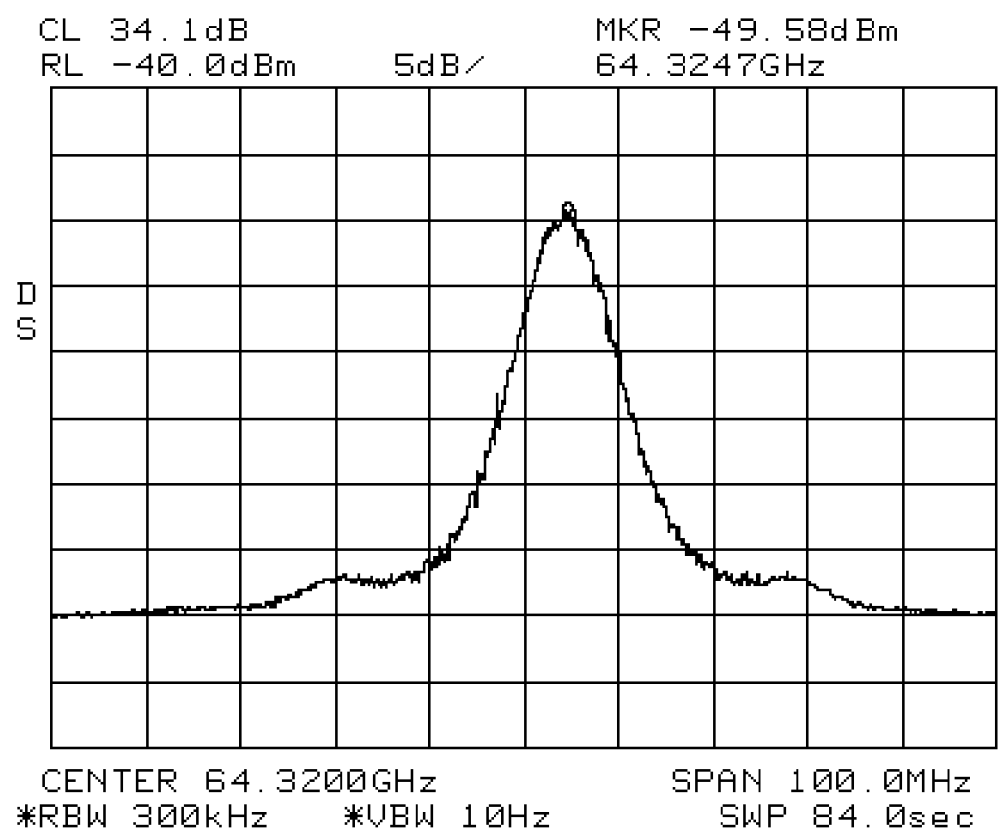
FIG. 9 is a graph illustrating a sample experimental 60 GHz output spectrum of the photo-detector when $\Delta\lambda$ is equal to 0.5 nm.

An experimentally obtained example of the electrical millimeter wave signal output is as shown in FIGS. 8 and 9 respectively.

The invention claimed is:

1. An apparatus for generating a millimeter wave signal for use in optical data transmission, the apparatus comprising of:
   a light source (101) that generates a variable multi-wavelength optical signal;
   a first amplifier (102) that amplifies the optical signal;
   a means (103) that splits the amplified optical signal;
   a means (104, 105) that filters and tunes the split optical signals;
   a coupler (107) that combines the optical signals resulting in the dual wavelength optical signal with the wavelength separation ($\Delta\lambda$) equivalent to the millimeter wave signal of desired frequency in the electrical domain;
   a second amplifier (108) that amplifies and gain flattens the dual wavelength optical signal output of the coupler (107);
   a photo-detector (109) that converts the amplified dual wavelength optical signal into the millimeter wave signal by way of heterodyning;
   characterized in that the apparatus further includes a controller (106) for stabilizing the millimeter wave electrical signal output, wherein the controller (106) controls the number of stoke lines emitted by the light source (101), the gain of the amplifying means (102, 108) and the tuning of the filtering means (104, 105) based on the electrical millimeter wave output.

2. An apparatus according to claim 1, characterised in that the controller (106) is an optoelectronic control circuit.

3. An apparatus according to claim 1, characterised in that the light source (101) is a Stimulated Brillouin Scattering source that is capable of generating a variable stoke line multi-wavelength optical source.

4. An apparatus according to claim 3, characterised in that the number of stoke lines are limited by the frequency range encompassed by the Extra High Frequency (EHF) band of the electromagnetic spectrum.

5. An apparatus according to claim 1, characterised in that the output of the coupler (107) is an optical signal that corresponds to the difference in frequencies of the signals from the filtering means (104, 105).

6. An apparatus according to claim 1, characterised in that the filtering means (104, 105) is tuned to an optical signal of a predetermined wavelength such that the difference in frequency between each optical signal from the output of the filtering means (104, 105) is an integer multiple of a numerical value of frequency that lies in the EHF band of the electromagnetic spectrum.

7. An apparatus according to claim 1, characterised in that the first and second amplifiers (102, 108) are Erbium-doped fibre amplifiers.

8. An apparatus according to claim 1, characterised in that the tuneable filtering means (104, 105) are fibre Bragg grating optical filters.

9. An apparatus according to claim 1, characterised in that the optical splitting means (103) divides the optical signal produced by the light source (101) into equal proportions (50:50).

10. A method for generating a millimeter wave signal for use in optical data transmission, the method comprising the steps of:
   i) generating a variable stoke line multi-wavelength optical signal (601);
   ii) controlling the number of stoke lines by way of an optoelectronic control circuit (602);
   iii) amplifying the variable stoke line multi-wavelength optical signal (603);
   iv) splitting the variable stoke line multi-wavelength optical signal into equal proportions (50:50), whereby the resultant signal are equal in terms of magnitude, phase, frequency and electromagnetic mode (604);
   v) filtering the optical signals that have been split using tuneable optical filters that are tuned to select the desired stoke line or optical signal of desired wavelength (605);
   vi) combining the output of the optical filters to produce an optical signal such that the frequency of the produced optical signal is an integer multiple of a numerical value of a frequency that lies in the Extra High Frequency (EHF) band of the electromagnetic spectrum (606);
   vii) amplifying and flattening the optical signal obtained in step (607);
   viii) heterodyning and hence converting the signal obtained in step to an electrical millimeter wave signal (608); and
   ix) stabilizing the electrical millimeter wave signal output (609).

* * * * *